United States Patent [19]

Pottharst, Jr.

[11] 4,002,538
[45] Jan. 11, 1977

[54] DISTILLATION APPARATUS AND METHOD

[76] Inventor: John E. Pottharst, Jr., 861 Carondelet St., New Orleans, La. 70130

[22] Filed: Aug. 5, 1974

[21] Appl. No.: 494,891

Related U.S. Application Data

[63] Continuation-in-part of Ser. No. 414,293, Nov. 9, 1973, abandoned.

[52] U.S. Cl. .............................. 203/10; 159/27 B; 159/1 C; 159/47 R; 202/235; 202/237; 203/26
[51] Int. Cl.² ...................... B01D 3/00; B01D 3/10
[58] Field of Search .............. 159/24 R, 24 B, 1 R, 159/1 W, 1 C, 17 C, 17 R, 27 B, 20 R, 20 CS, 47 R; 203/10, 11, 24, 26, DIG. 5; 202/232, 235, 237

[56] References Cited

UNITED STATES PATENTS 3,000,795  9/1961  Goeldner ............................ 203/10

Primary Examiner—Frank W. Lutter
Assistant Examiner—Frank Sever
Attorney, Agent, or Firm—W. F. Hyer; Marvin B. Eickenroht

[57] ABSTRACT

A vapor compression type distillation apparatus and method is provided for distilling brackish water or seawater wherein increased efficiency can be achieved by virtue of an arrangement and operation which maximizes the average effective temperature differential between steam being condensed and the water being vaporized. Thus a vertical shell and tube vaporizer is provided which includes an array of tubes which array has a width substantially greater than its depth. The liquid discharged from the upper ends of the tubes is caused to flow downwardly in a downtake passage into a body of water at the lower end of the vaporizer along substantially the entire width of the array. Feed water is fed into the body of water at the lower end of the vaporizer at one end of the array and blowdown is taken from such body at the other end of the array.

10 Claims, 8 Drawing Figures

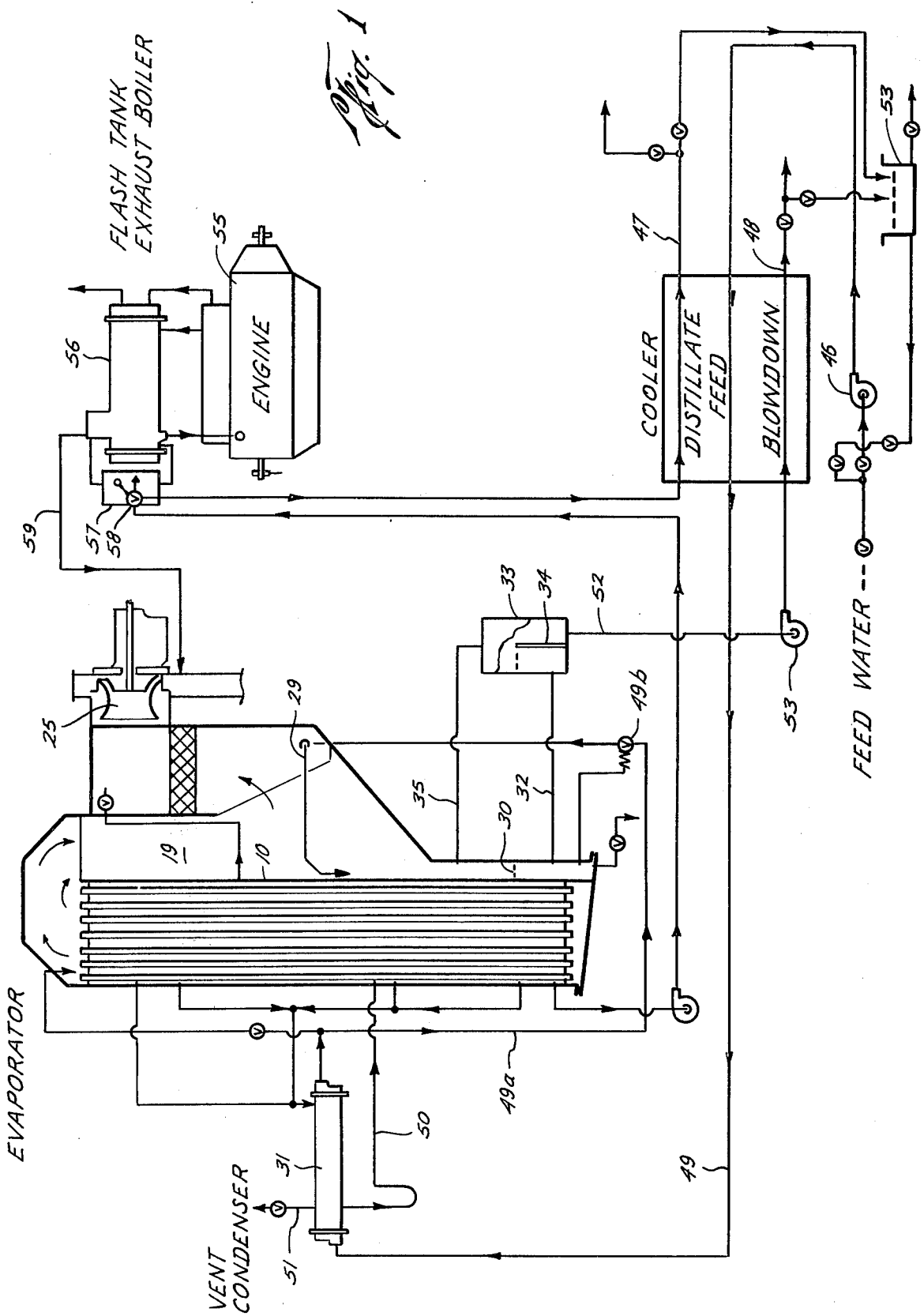

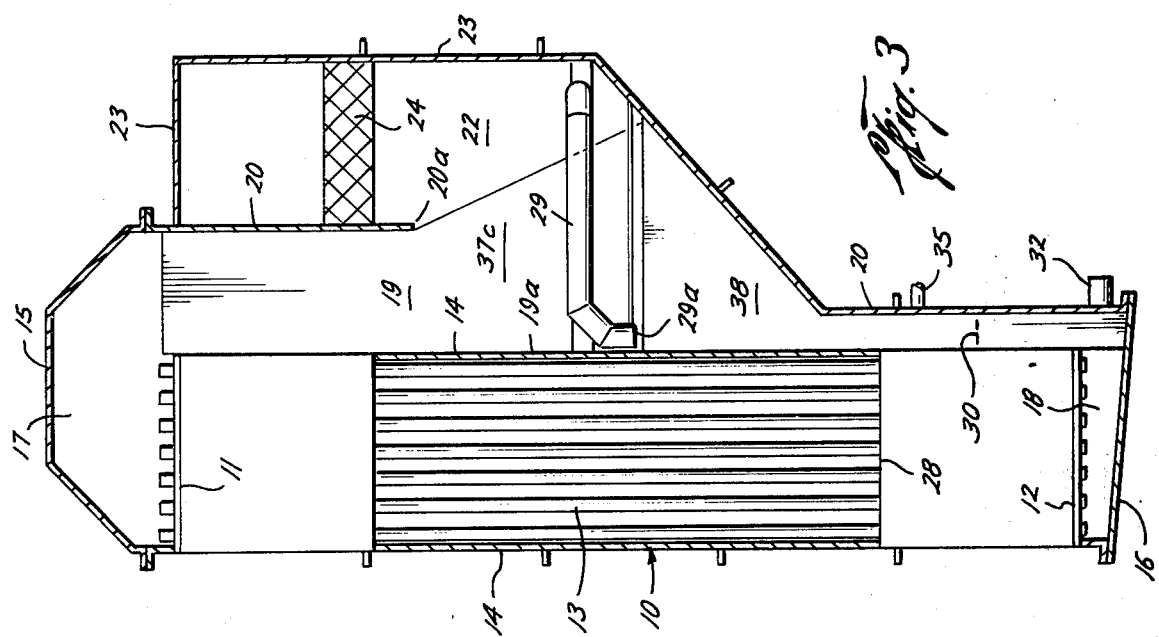
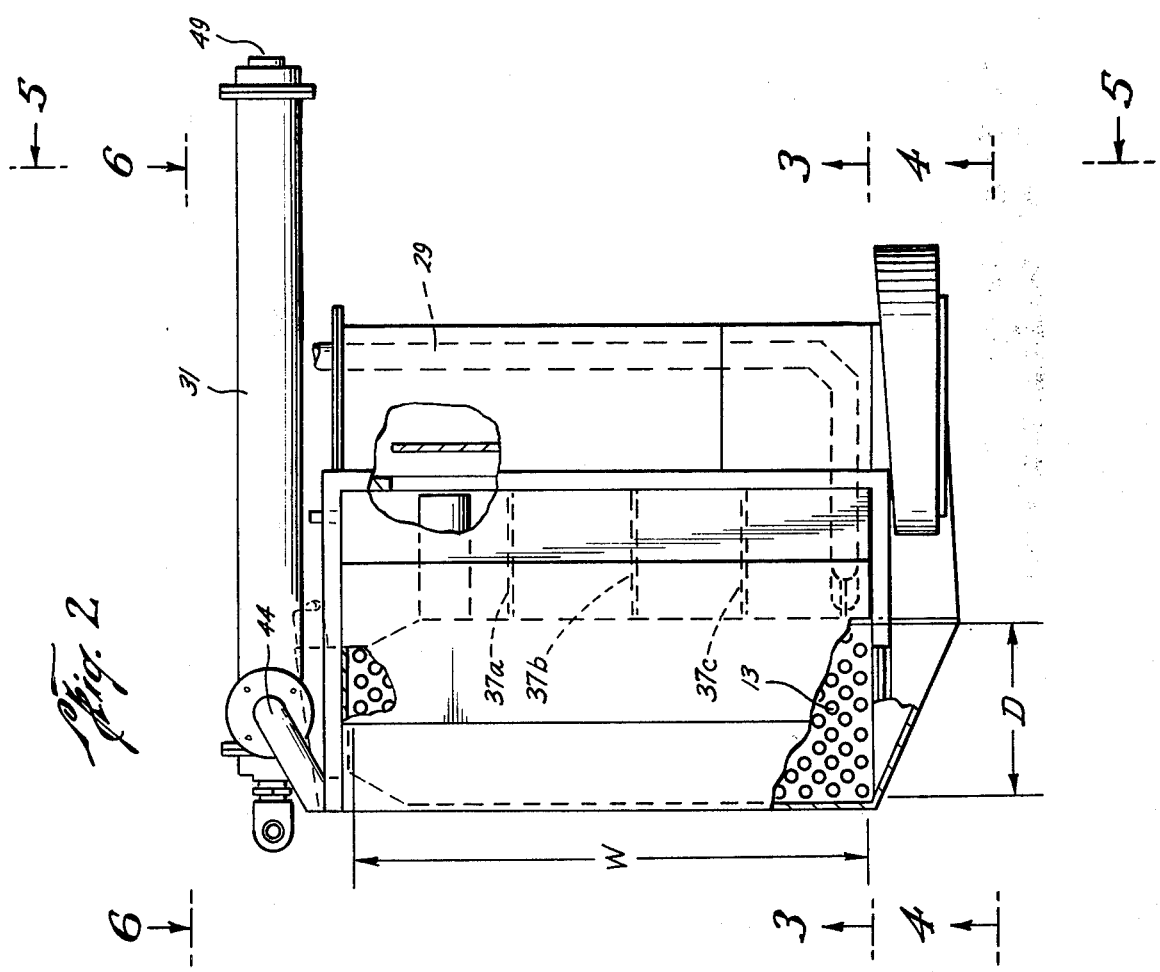

DISTILLATION APPARATUS AND METHOD

This application is a continuation in part of my application Ser. No. 414,293, filed Nov. 9, 1973, now abandoned.

This invention relates to an improved apparatus and method for the vapor compression distillation of brackish water or seawater and particularly to an arrangement wherein the effective temperature differential is maximized for a given set of operating and equipment parameters.

In a typical commercially available vapor compression type distillation unit for distilling brackish water or seawater, the water being circulated through the tubes throughout the unit has a salt content which is substantially uniform throughout the unit. This salt content is normally equal to or slightly less than that of the blowdown. As a result, the boiling point elevation is at a maximum throughout the unit and the temperature differential between the condensing steam and the water being evaporated is consequently at a minimum uniform value. For example, seawater having a salt concentration equivalent to 32,000 PPM to NaCl has a boiling point elevation of about 1° F. as it flows into the vaporizer at 212° F. Assuming a concentration ratio of 2 (one gallon of blowdown per two gallons of feed) the blowdown will have about 64,000 PPM of NaCl and a boiling point elevation of about 2.2° F. In this typical unit, the steam is compressed until its temperature rises by about 5° F. Since the seawater within the unit is homogenous in salt content, the mean temperature difference is then 2.8° F. Due to the mean temperature difference typically being quite small, a variation in a few tenths of a degree in the effective mean temperature difference can result in substantial change in efficiency. For example, an increase of about 0.5° in the mean temperature difference can result in an 18% increase in efficiency.

It is an object of this invention to provide an apparatus and method for the vapor compression distillation of brackish water or seawater wherein the arrangement is such that the effective average mean temperature difference between the condensing steam and the water being distilled is maximized to improve the overall efficiency.

Another object is to provide such an apparatus and method wherein the feedwater is fed thereinto near one end of an array of tubes and a blowdown is taken from the other end of the array and the circulation rate through the tubes is made sufficiently high that the water tends to flow serially through succeeding groups of the tubes so that the salt concentration is at a minimum in the tubes at the feed end of the array and at a maximum at the blowdown end thereby increasing the average temperature difference across the entire array.

These and other objects, advantages and features of the invention will become more apparent to one skilled in the art upon consideration of the specification, the claims and the attached drawings wherein:

FIG. 1 is a semi-schematic drawing illustrating a preferred embodiment of the invention;

FIG. 2 is a plan view of the vaporizer or evaporator illustrated in FIG. 1;

FIG. 3 is an elevational view taken on the line 3—3 of FIG. 2;

Figure 5:
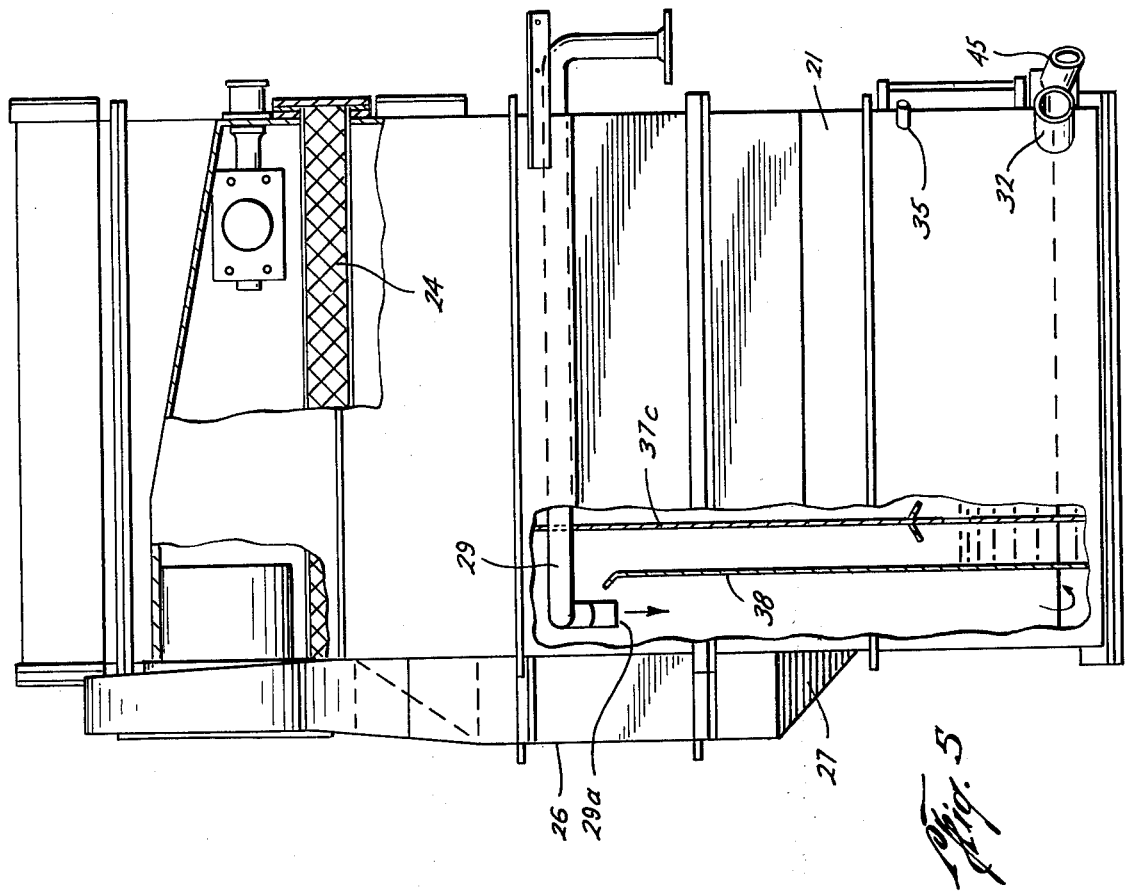
FIG. 5 is an elevational view with parts broken away and taken on the line 5—5 of FIG. 2.
Figure 4:
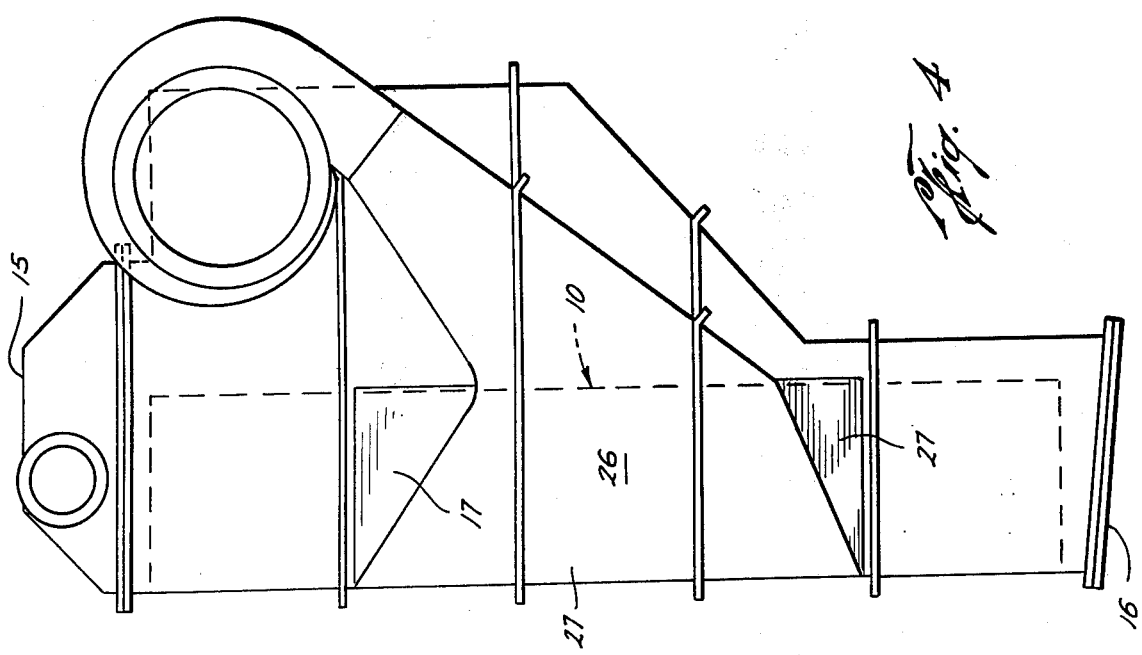
FIG. 4 is an elevational view taken on the line 4—4 of FIG. 2.

In accordance with this invention, a vertical shell and tube type vaporizer or evaporator is arranged in a vapor compression distillation circuit. The vaporizer is provided with upper and lower closure members which, with the upper and lower tube sheets, form upper and lower chambers in fluid communication with the upper and lower ends of the tubes, respectively. The tubes of the vaporizer are positioned in an array which has a width substantially greater than its depth. Means are provided which form a downtake passage between the chambers and having an inlet from and an outlet into the upper and lower chambers respectively with such inlet and outlet extending along the upper and lower tube sheets for a distance at least substantially the width of the array. The arrangement is such that the water emerging from the upper ends of the tubes can flow into the downtake passage down into a body of water in the lower chamber in such a manner that the water discharged from one group of tubes will flow into a succeeding group of tubes without excessive commingling with the water flowing into the first group of tubes. In this manner, the unevaporated liquid can in effect spiral through successive tubes in a more or less series fashion without substantial recirculation of the liquid back through the same tubes from which it was discharged. Then by providing the feedwater inlet means to discharge feed for flow into tubes adjacent one end of the array and a blowdown means having an inlet adjacent the other end of the array, a hydraulic gradient will be established therebetween which facilitates the liquid flowing serially through successive tubes. As a result of this overall arrangement and procedure, the concentration of dissolved salts in the body of water increases along the length of the array from that at the feed end of the array to the blowdown end whereby the boiling point elevation of the water being circulated increases and the effective temperature differential decreases from one end of the array to the other. The result is that the average temperature difference between the condensing steam and the water in the tubes is increased over that of a conventional vapor compression unit in which the water in the lower chamber is homogenous in its salt content.

At least in smaller units, the more or less serial flow of the water being evaporated can be caused by suitably adjusting certain parameters as discussed below. However, if desired, suitable baffling can be installed in the downtake passage to mechanically assure this serial flow and this may be particularly desirable in very large units.

Referring now to the drawings, the evaporator or vaporizer 10 comprises the vertical shell and tube heat exchanger. Thus it includes an upper tube sheet 11 and a lower tube sheet 12 and a plurality of vertical tubes 13 extending therebetween. Also extending between the tube sheets and surrounding tubes is a shell 14. The evaporator also includes upper and lower closure members 15 and 16 which form upper and lower chambers 17 and 18 in fluid communication with the upper and lower ends of the tubes, respectively. Extending between these chambers is a downtake or downcomer passage 19 which is formed by walls 20 and 21 and a sidewall 19a of shell 14. It will be noted that the downtake passage 19 is positioned laterally of the shell and the tube evaporator for reasons which will be explained below.

Means are provided which form an upwardly extending vapor outlet passage 22 which is laterally displaced from downtake passage 19. Such means includes walls 23 as well as wall 20. The latter terminates at 20a so as to provide an inlet to the vapor outlet passage 22 from downcomer 19 at a level below that of the upper tube sheet.

A conventional mist eliminator 24 can be provided in the vapor outlet passage to eliminate a reasonable amount of entrained liquid droplets from the vapor.

A vapor compressor 25 is mounted to take suction from the upper end of vapor passage 22 and is adapted to compress such vapor to increase its temperature and heat content and to discharge the compressed vapor into the shell of the evaporator where the vapor is condensed to give up its heat and cause the vaporization of liquid within the evaporator tubes. Thus the discharge duct 26 if formed by walls 27 to extend from the compressor discharge to an opening 28 in shell 14 whereby compressed vapor from the vapor compressor 25 can flow into the shell as indicated above.

Suitable means provide a feed inlet and this means can take the form of a pipe 29 having a discharge port 29a discharging downwardly into the downtake passage 19 at a point spaced above the liquid level 30. Thus the feed water is preheated in a vent condenser 31 and then passes through a control valve 29b to be discharged near or adjacent one end of the array of tubes as discussed more fully below. It is preferred that the preheated feed liquid be discharged downwardly for free fall into the liquid in lower chamber 18 and during such fall, noncondensible gases as well as any steam formed by flashing can be separated from the liquid for flow upwardly and out the vapor outlet passage 22. The downfalling feed water also may tend to break up any froth lying on the body of water therebelow.

A blowdown outlet pipe 32 is provided to be in fluid communication with the body of water in chamber 18 adjacent the other end of the tube array opposite to the end into which the feed is introduced. The blowdown flows via pipe 32 to a level control vessel 33 having a weir 34 therein which determines the level of liquid in the evaporator. A pressure equalizing line 35 can be connected between the evaporator and the blowdown vessel 33. In this manner, means are provided for maintaining the liquid level 30 above the level of the lower tube sheet 12 and preferably within the lower 25% of the length of the tubes. The level should be adjusted to be low enough to minimize the amount of froth that must be passed upwardly through and out of the tubes and hence the amount flowing laterally across the top tube sheet. On the other hand, the level should be sufficiently high that the amount of frothy mixture flowing through the tubes is sufficient to continually wet tube surfaces to assure that dry spots or localized concentration does not occur in the tubes. Thus, for example, if the water level is too high, there results excessive amounts of froth (or "circulation") being discharged from the tubes, with correspondingly lower heat transfer rates. On the other hand, if the level is too low, the evaporating action in the upper portion of some of the tubes may cease altogether with resultant overconcentration of salts in these tubes and excessive scaling. This decreases the mean temperature difference between the condensing vapor and the liquid being evaporated which makes circulation in these tubes even more difficult to establish.

As indicated particularly in FIG. 2, the tubes 13 are arranged in an array which has a width W substantially greater than its depth D and preferably, the width will be at least 2.5 times the depth. While the illustrated array is shown to be rectangular in configuration, which is preferred, other forms of arrays can be used to obtain similar results provided that the mode of operation and principles described herein are employed. Also, in a preferred form, the inlet to the downtake passage 19 is made substantially flush with the upper tube sheet 11 and extends a distance therealong which is a major portion of and preferably at least substantially equal to the width W of the array. Similarly, the outlet from the downtake passage into the lower chamber 18 has a width of similar proportions with respect to the array. With the arrangement as thus far described and with the water level adjusted as discussed above, the circulation rate through the tubes will be sufficiently high that the feed water introduced near one end of the array will be circulated upwardly through the tubes near such end of the array without excessive commingling with the remainder of the body of water in chamber 18. Therefore, the salt content (the term "salt content" is used to include all dissolved salts) of the water passing upwardly through this first group of tubes is only slightly greater than the concentration of salt in the incoming feed. As a result, the temperature differential between the steam within the shell and the liquid within the first group of tubes will be relatively large. When the unvaporized liquid is discharged from the upper end of this first group of tubes, it is free to flow downwardly through the downtake passage into the body of water within the lower part of the downtake passage. Since there is a hydraulic gradient in the liquid level 30 from the feed end to the blowdown end, the water falling downwardly from the first group of tubes tends to flow laterally and then upwardly through a second group of tubes. This circulation continues through the remaining groups of tubes in the array so that in effect there is a "spiral" circulation of water through successive groups of tubes thereby, in overall effect, causing the liquid being distilled to flow serially through the groups of tubes. Therefore, there exists a concentration of dissolved salts in the water in chamber 18 which increases gradually from substantially that of the feed water at the inlet end of the array to that of the blowdown at the other end of the array. As a result, the boiling point elevation of the water being circulated increases and the effective temperature differential decreases from the feed end of the array to the blowdown end. This results in a decrease in the average boiling point elevation loss which provides, in turn, an increase in water production and efficiency of the unit.

By way of example, a unit constructed in accordance with this invention and having an array of tubes about 40 inches in width and about 14 inches in depth and operating with a net mean temperature difference of about 4° F. above the boiling point of seawater, exhibited the following concentrations of salt across the length of the body of water in the lower end of the unit:

| | |
|---|---|
| Seawater feed to distillation unit: | 19,000 PPM |
| Water at 1.5 inches from inlet end of evaporator: | 23,000 PPM |
| Water at 15 inches from inlet end of evaporator: | 26,000 PPM |
| Water at 24.9 inches from inlet end of evaporator: | 29,000 PPM |
| Water at 33.6 inches from inlet end of evaporator: | 32,000 PPM |
| Blowdown leaving unit: | 37,000 PPM |

In a conventional unit operating with the same feed water and the same 4° F. temperature differential and with a substantially uniform salt content throughout the liquid in the unit, the boiling point elevation loss would be about 2.1° F. With a vaporizer operated in accordance with this invention and with the above described array of tubes and distribution of concentration of salts, the boiling point elevation loss is only about 1.6° F. In this particular instance, this will permit an increase in the mean temperature difference from 4 to 4.5° F. thus increasing the output by 12.5%. On the other hand, the output could be held constant by reducing the power input to the compressor so that the temperature boost in the steam would be only 5.6° F. instead of 6.1° F. thereby saving fuel.

It will be appreciated that the increase in boiling point elevation will not abruptly change from one transverse row of tubes in the array to the next row but will gradually change along the width of the array. However, one can divide the tubes into succeeding groups and calculate the boiling point elevation which is the average for that group and compare it with the average boiling point elevation for a succeeding group. And when the term "group of tubes" is used in the specification and claims, it is used in this context.

In some cases, particularly in larger units, it may be desirable to mechanically isolate the liquid emerging from one group of tubes from that emerging from a succeeding group so that there will not be excessive commingling between the liquids from the two groups of tubes and they will be separately conducted to separate but adjacent zones in lower chamber 18. Thus, for example, baffles 37a, b and c can be provided transversely of the downtake passage to terminate below the lower tube sheet 12 and thus direct liquid into successive zones along the length of the lower chamber 18.

Additionally, a baffle 38 as shown in FIG. 5, can be provided adjacent the inlet end of the array so that the incoming feed water from pipe 29 is isolated from the liquid in the downtake passage until it passes under the lower tube sheet as indicated.

Figure 7:
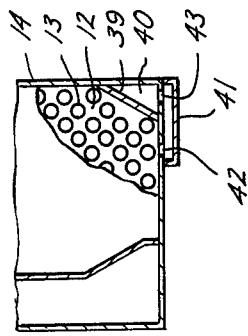
FIG. 7 is a view taken on the line 7—7 of FIG. 6 with parts broken away.

As indicated in FIG. 7, a vent baffle 39 can be disposed diagonally across one corner of shell 14 to extend between the upper and lower tube sheets and provide a vent passage 40. This vent passage 40 is in fluid communication with the shell side of the vaporizer by means of boxes 41 bridging between openings 42 and 43 which permit noncondensibles to flow into the vent passage 40. The vent passage is also in communication via pipe 44 with vent passage 40 and vent condenser 31. In this manner, the incoming feedwater is not only preheated but the noncondensibles are drawn out through the vent condenser for discharge.

Figure 8:
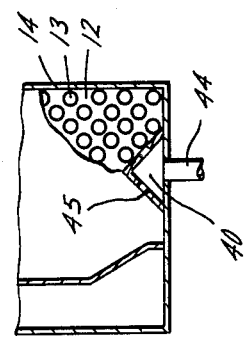
FIG. 8 is a view similar to FIG. 7 but showing another embodiment.
Figure 6:
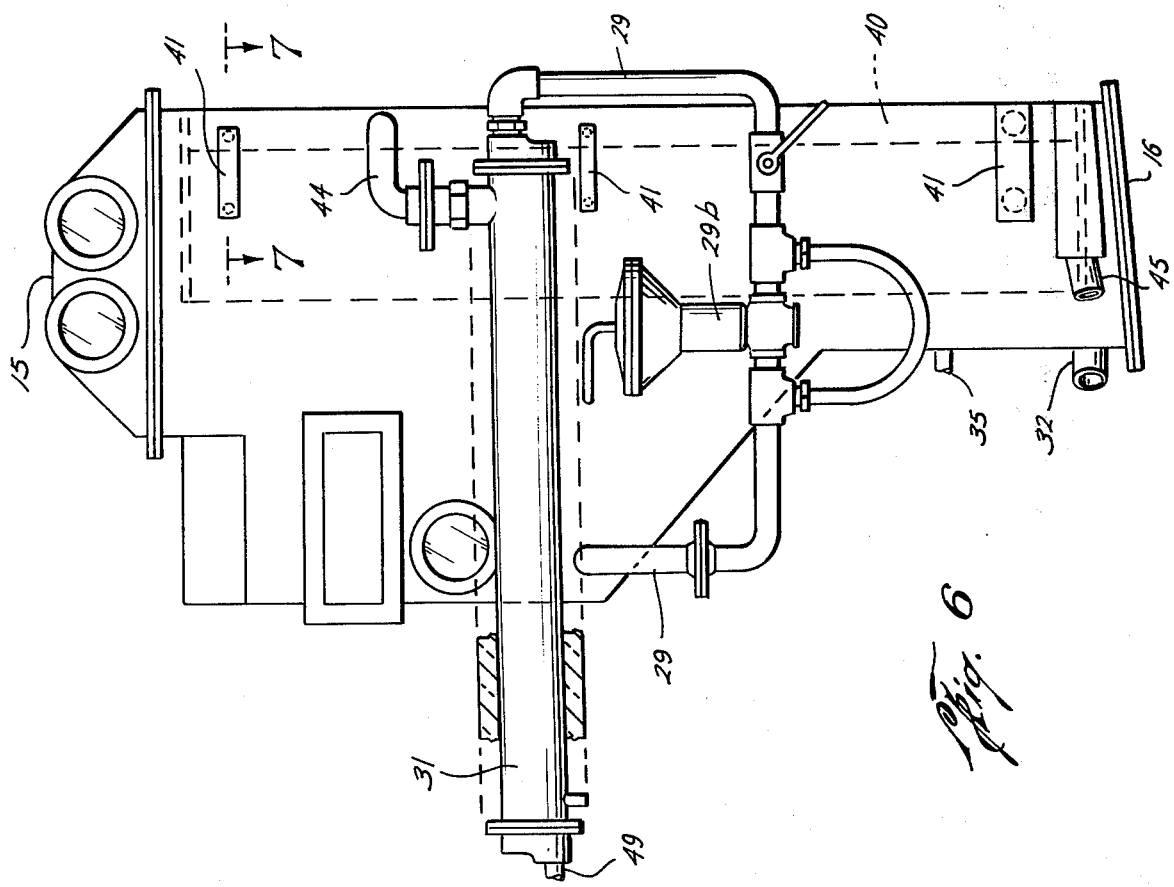
FIG. 6 is an elevational view taken on the line 6—6 of FIG. 2.

Another arrangement of the vent passage is shown in FIG. 8. In this embodiment, the vent baffle is in the form of a slotted vertically extending inverted V-shaped member 45 extending between the upper and lower tube sheets and communicates with the shell side of the vaporizer via the slots therein so that noncondensibles can flow into vent pipe 44. This arrangement eliminates external boxes 41 of the FIG. 7 arrangement and also provides for a more balanced withdrawal of noncondensibles.

A condensate outlet 45 can be provided in a conventional manner to communicate with the lower part of the shell side of the vaporizer for the removal distillate.

The evaporator system shown in FIG. 1 includes the necessary additional equipment to provide a complete vapor compression distillation system of the engine driven type, but the same evaporator is applicable to electric motor driven and other types. Thus the feed can be passed to a feed pump 46 and then through a cooler where it is preheated by heat exchange with distillate in line 47 and with blowdown in line 48. The thus partially preheated feed passes through line 49 through the vent condenser 31 where it is further heated by heat exchange with noncondensibles and vapor passing from the shell side of the heat exchanger via vent pipe 44. The preheated feed then flows via line 49a to feed pipe 29 via a control valve 49b. Distillate condensed in condenser 31 can be returned to the shell side of the heat exchanger by line 50 while noncondensibles are withdrawn via line 51. Usually, it will be desirable to preheat the feed so that it will be at a temperature slightly below, at, or slightly above its boiling temperature when it is discharged through the downtake.

Blowdown from blowdown outlet pipe 32 passes through the level control vessel 33 and then through line 52 to blowdown pump 53 which pumps it through the cooler to preheat the feed after which it is discharged to waste. A portion can be passed through acid tank 53 and then mixed with acid for a periodic descaling and then returned (with distillate) as feed just ahead of feed pump 46.

A distillate pump 54 pumps a small portion of the distillate into the jacket water cooling system of engine 55. This engine discharges its exhaust gases into an exhaust boiler 56. Thus distillate is passed to a distillate vessel 57 under the control of a level control valve 58 which admits enough distillate to the jacket water cooling system to compensate for the distillate which has been vaporized in exhaust boiler and engine cooling jackets. The vapor so produced is passed via line 59 to be mixed with the discharge from compressor 25. The excess distillate flows through the cooler to product storage.

From the foregoing, it will be seen that this invention is one well adapted to attain all of the ends and objects hereinabove set forth, together with other advantages which are obvious and which are inherent to the article apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is

1. A method of distilling brackish water or seawater using a vertical shell and tube vaporizer including an array of tube having a width substantially greater than its depth comprising the steps of establishing a body of water at the lower end of the vaporizer along substantially the entire width of said array and with a level such as to extend into the lower end of said tubes to be heated therein in such a manner that the discharge from the upper ends of the tubes is a frothy mixture of vapor and liquid, compressing such vapor and then passing it in heat exchange relation with the water being vaporized in said tubes, flowing the liquid discharged from the upper ends of said tubes laterally to one side of the array of tubes and then downwardly into said body of water along a major portion of its width; flowing feed water into said body of water adjacent one end of said array and flowing blowdown from said body of water adjacent the other end of said array; whereby the concentration of dissolved salts in said body of water increases from substantially that of the feed water at said one end of the array to substantially that of the blowdown at the other end of the array.

2. The method of claim 1 wherein the liquid discharged from one group of tubes in the array is isolated from that discharged from a succeeding group of tubes and flowing at least a portion of the liquid so isolated into the body of water beneath the succeeding group of tubes.

3. A method of distilling brackish water or seawater using a vertical shell and tube vaporizer including an array of tubes having a width substantially greater than its depth comprising the steps of establishing a body of water at the lower end of the vaporizer along substantially the entire width of said array and with a level such as to extend into the lower end of said tubes to be heated therein in such a manner that the discharge from the upper ends of the tubes is a frothy mixture of vapor and liquid, compressing such vapor and then passing it in heat exchange relation to the water being vaporized in said tubes, flowing the liquid discharged from the upper ends of said tubes laterally to one side of the vaporizer and then downwardly through a flow zone and discharging it into said body of water along a major portion of the latter's width; flowing feed water into said body of water adjacent one end of said array and flowing blowdown from said body of water adjacent the other end of said array; whereby the concentration of dissolved salts in said body of water increases along its length from one end of the array to the other end of the array so that the boiling point elevation of the water being circulated increases and the effective temperature differential decreases from said one end of the array to its other end.

4. The method of claim 3 wherein said flow zone has a width substantially equal to the width of the array and wherein downwardly flowing liquid is discharged into said body of water along substantially the entire width of said array.

5. The method of claim 3 wherein the width of said array is at least 2.5 times its depth.

6. The method of claim 3 including the step of isolating the frothy mixture discharged from one group of tubes in the array from that discharged from another group of tubes and flowing at least a portion the water discharged from said one group of tubes downwardly into the body of water beneath the other group of tubes.

7. A vapor compression distillation apparatus for distilling brackish water or seawater comprising, in combination, a vertical shell and tube vaporizer including upper and lower tube sheets with an array of tubes therebetween, said array having a width substantially greater than its depth, the vaporizer having upper and lower closure members forming upper and lower chambers respectively in fluid communication with the upper and lower ends of said tubes; vapor compression means having a suction inlet on the tube side of said vaporizer and a discharge outlet into the shell side of the vaporizer; means forming a downtake passage between said chambers with an inlet from and an outlet into the upper and lower chambers respectively, said inlet and outlet respectively extending along the upper and lower tube sheets for a distance at least substantially the width of the array; feed water inlet means for discharging feed for flow into the tubes adjacent one end of the array and blowdown means having an inlet adjacent the other end of the array; the overall arrangement being such that with the apparatus in use, the concentration of dissolved salts in the water in the lower chamber increases from substantially that of the feed water at said one end of the array to that of the blowdown at said other end of the array.

8. The apparatus of claim 7 wherein the width of said array is at least 2.5 times its depth.

9. The apparatus of claim 7 wherein the tubes in said array are arranged in a plurality of groups and wherein a baffle is provided in the downtake passage means between succeeding groups so as to prevent end-wise flow of water in the downtake passage means, and thus prevent short-circuiting of the feed to the blowdown outlet.

10. In a vapor compression distillation apparatus for distilling brackish water or seawater having a vertical shell and tube vaporizer with an array of tubes and means for compressing the vaporized steam and passing it in heat exchange relation with the water being vaporized in the tubes, the improvement comprising said array having a substantially greater width than depth, a downtake passage having an inlet and an outlet extending along substantially the width of the array for receiving liquid emerging from the upper ends of the tubes for recirculation therethrough in a manner such that the liquid emerging from one group of tubes tends to flow downwardly for upward flow through a succeeding group of tubes; feed water inlet means arranged to discharge feed into the vaporizer at one end of the array for upward flow through the tubes at such one end; and blowdown means arranged to withdraw liquid at the other end of the array so that in use, the concentration of dissolved salts in the liquid at the lower ends of the tubes increases from substantially that of the feed water at said one end of the array to that of the blowdown at said other end of the array.

* * * * *